United States Patent
Hirano

(10) Patent No.: US 9,670,868 B2
(45) Date of Patent: Jun. 6, 2017

(54) AUTOMATIC STOPPING DEVICE AND AUTOMATIC STOPPING METHOD FOR INTERNAL COMBUSTION ENGINE

(75) Inventor: Masahiro Hirano, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 861 days.

(21) Appl. No.: 13/811,490

(22) PCT Filed: Jul. 21, 2011

(86) PCT No.: PCT/JP2011/066593
§ 371 (c)(1),
(2), (4) Date: Jan. 22, 2013

(87) PCT Pub. No.: WO2012/011533
PCT Pub. Date: Jan. 26, 2012

(65) Prior Publication Data
US 2013/0124072 A1  May 16, 2013

(30) Foreign Application Priority Data

Jul. 23, 2010  (JP) .................................. 2010-165711

(51) Int. Cl.
*F02D 45/00* (2006.01)
*F02D 17/04* (2006.01)
(Continued)

(52) U.S. Cl.
CPC ............ *F02D 45/00* (2013.01); *F02D 17/04* (2013.01); *F02D 29/02* (2013.01);
(Continued)

(58) Field of Classification Search
CPC ............ F02N 11/0803; F02N 11/0814; F02N 11/0818; F02N 11/0822; F02N 11/0833; F02N 11/084
See application file for complete search history.

(56) References Cited

U.S. PATENT DOCUMENTS

| 6,532,926 B1* | 3/2003 | Kuroda ............. B60H 1/00778 123/179.4 |
| 2002/0096137 A1* | 7/2002 | Kobayashi ............. B60K 6/485 123/179.4 |

(Continued)

FOREIGN PATENT DOCUMENTS

| JP | 2003-148314 A | 5/2003 |
| JP | 2004-76599 A | 3/2004 |

(Continued)

OTHER PUBLICATIONS

Chinese Office Action dated Nov. 2, 2014, 7 pgs.

*Primary Examiner* — Erick Solis
*Assistant Examiner* — Anthony L Bacon
(74) *Attorney, Agent, or Firm* — Foley & Lardner LLP

(57) ABSTRACT

When a first automatic stopping condition is established while a vehicle (1A, 1B) is stationary or a second automatic stopping condition is established during travel, an internal combustion engine (2) of the vehicle is automatically stopped. The first automatic stopping condition is established when a battery voltage or a battery state of charge of a battery (21) equals or exceeds a first threshold, and the second automatic stopping condition is established when the battery voltage or the battery state of charge of the battery (21) equals or exceeds a second threshold. By setting the second threshold to be greater than the first threshold, opportunities for automatically stopping the internal combustion engine (2) are secured while satisfying a power requirement of an electrical load (26, 27) during restarting of the internal combustion engine (2).

4 Claims, 8 Drawing Sheets

(51) Int. Cl.
  *F02D 29/02* (2006.01)
  *F02N 11/08* (2006.01)
(52) U.S. Cl.
  CPC ........ *F02N 11/0833* (2013.01); *F02N 11/084* (2013.01); *F02N 11/0825* (2013.01); *F02N 11/0855* (2013.01); *F02N 2200/061* (2013.01); *F02N 2200/063* (2013.01); *Y02T 10/48* (2013.01)

(56) References Cited

U.S. PATENT DOCUMENTS

| | | | | |
|---|---|---|---|---|
| 2003/0144773 | A1* | 7/2003 | Sumitomo | B60K 6/442 |
| | | | | 701/22 |
| 2004/0206325 | A1* | 10/2004 | Momcilovich | F02N 11/04 |
| | | | | 123/179.4 |
| 2005/0061563 | A1 | 3/2005 | Syed et al. | |
| 2005/0143901 | A1* | 6/2005 | Scholt | F02N 11/0818 |
| | | | | 701/112 |
| 2006/0150937 | A1* | 7/2006 | Lupo | F02D 41/042 |
| | | | | 123/179.4 |
| 2009/0204314 | A1 | 8/2009 | Aoki et al. | |

FOREIGN PATENT DOCUMENTS

| | | | | |
|---|---|---|---|---|
| JP | 2005133682 A | * | 5/2005 | .......... F02N 11/0833 |
| JP | 2007-287493 A | | 11/2007 | |

\* cited by examiner

12 UPPER CLUTCH SWITCH
13 LOWER CLUTCH SWITCH
14 SHIFT SENSOR
15 BRAKE SWITCH
16 CRANK ANGLE SENSOR
17 VEHICLE SPEED SENSOR
18 VOLTAGE SENSOR

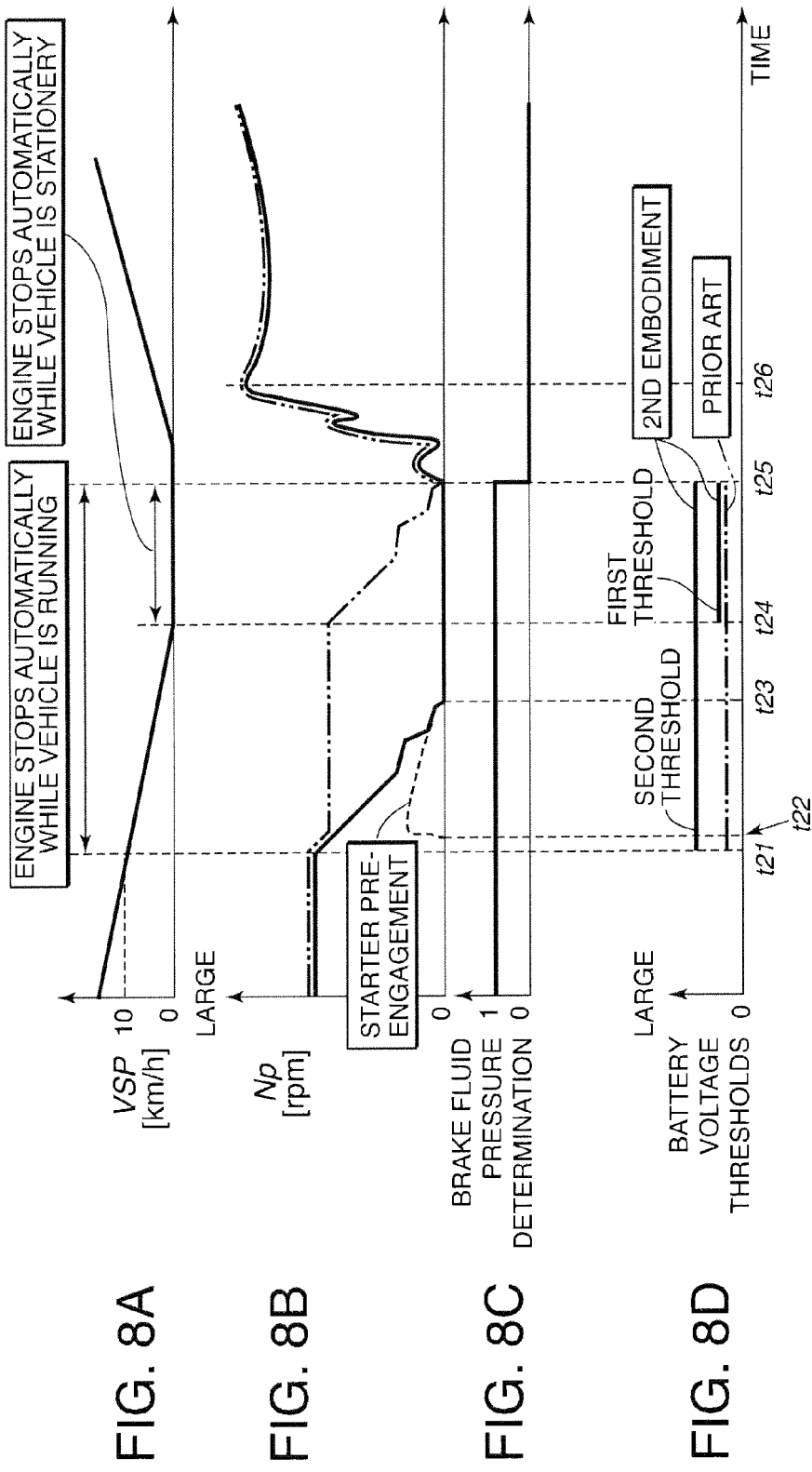

AUTOMATIC STOPPING DEVICE AND AUTOMATIC STOPPING METHOD FOR INTERNAL COMBUSTION ENGINE

FIELD OF THE INVENTION

This invention relates to automatic stopping and restarting of an internal combustion engine for a vehicle.

BACKGROUND OF THE INVENTION

JP 2003-148314 A, published by the Japan Patent Office in 2003, proposes an engine automatic stopping device that automatically stops an internal combustion engine when a predetermined condition is established during vehicle travel.

This prior art reference teaches that when a battery capacity is lower than a predetermined value, automatic stopping of the engine is prohibited. Further, this prior art reference teaches that in order to increase opportunities for automatically stopping the internal combustion engine, the internal combustion engine is automatically stopped after the predetermined condition is established not only while the vehicle is stationary but also while the vehicle is traveling.

A battery capacity at which automatic stopping of the internal combustion engine is permitted is set in consideration of an engine start performance and an electrical equipment performance during engine restarting.

SUMMARY OF THE INVENTION

According to the prior art reference, the battery capacity at which automatic stopping of the engine is permitted is set at an identical value regardless of whether the vehicle is traveling or stationary. When the vehicle is traveling, however, a higher level of performance is required of the electrical equipment than when the vehicle is stationary, and therefore a power requirement of the electrical equipment is also high.

When the battery capacity at which automatic stopping of the engine is permitted is set in order to satisfy the power requirement of the electrical equipment during engine restarting while the vehicle is stationary, it may be impossible to satisfy the power requirement of the electrical equipment during engine restarting while the vehicle is traveling.

It is therefore an object of this invention to satisfy a power requirement of electrical equipment during restarting of an internal combustion engine after the internal combustion engine has been automatically stopped not only when a vehicle is stationary, but also when the vehicle is traveling.

In order to achieve the above object, this invention provides an automatic stopping device for an internal combustion engine of a vehicle comprising a battery that is charged by an operation of the internal combustion engine, and an electrical load that is operated by power stored in the battery.

The automatic stopping device is configured to stop the internal combustion engine automatically when a first automatic stopping condition is established during a vehicle stoppage or a second automatic stopping condition is established during vehicle travel.

The first automatic stopping condition is established when a battery voltage or a battery state of charge of the battery equals or exceeds a first threshold, and the second automatic stopping condition is established when the battery voltage or the battery state of charge of the battery equals or exceeds a second threshold. Herein, the second threshold is set to be greater than the first threshold.

The details as well as other features and advantages of this invention are set forth in the remainder of the specification and are shown in the accompanying drawings.

BRIEF DESCRIPTION OF THE DRAWINGS

FIGS. 8A to 8D are timing charts illustrating results of operation control executed on an internal combustion engine by an automatic stopping and automatic restarting device for an internal combustion engine according to the second embodiment of this invention.

DESCRIPTION OF THE PREFERRED EMBODIMENTS

An engine automatic stopping device according to a first embodiment of this invention will be described below with reference to the drawings.

Figure 1:
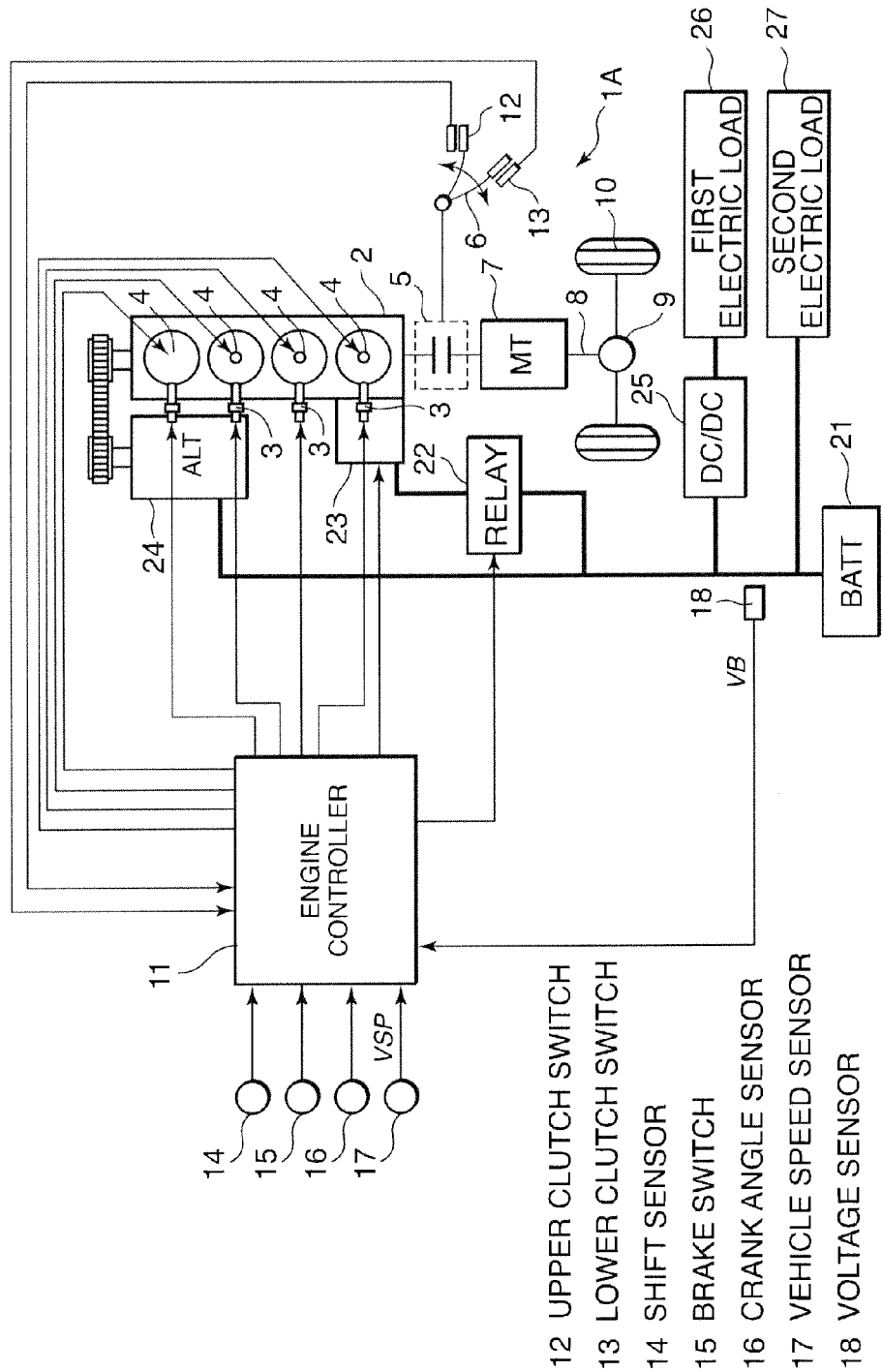
FIG. 1 is a schematic diagram of an automatic stopping and automatic restarting device for an internal combustion engine according to a first embodiment of this invention.

Referring to FIG. 1 of the drawings, a multi-cylinder internal combustion engine 2 installed in a vehicle 1A includes a fuel injector 3 and a spark plug 4 provided for each cylinder. In each cylinder of the internal combustion engine 2, fuel supplied from the fuel injector 3 is ignited by the spark plug 4 and burned, whereupon resulting combustion pressure is converted into rotary force, or in other words power.

The internal combustion engine 2 is connected to a manual transmission 7 via a clutch 5. Power transmitted to the manual transmission 7 from the internal combustion engine 2 is transmitted to a drive wheel 10 via a drive rod 8 and a final gear 9.

The clutch 5 is engaged/disengaged by a clutch pedal 6. The clutch pedal 6 is provided with an upper clutch switch 12 and a lower clutch switch 13 in order to detect an engagement/disengagement state between the internal combustion engine 2 and the manual transmission 7.

The upper clutch switch 12 outputs an ON signal when a driver of the vehicle 1A releases a foot from the clutch pedal 6, or in other words when the internal combustion engine 2 and the manual transmission 7 are directly coupled. Further, the upper clutch switch 12 outputs an OFF signal when the driver depresses the clutch pedal 6 in order to block engagement between the internal combustion engine 2 and the manual transmission 7.

The lower clutch switch 13 outputs an ON signal when the driver depresses the clutch pedal 6 such that engagement between the internal combustion engine 2 and the manual transmission 7 is completely blocked. In other cases, for example in a half clutch state where the driver has returned the clutch pedal 6 partway, engagement between the internal combustion engine 2 and the manual transmission 7 is not completely blocked, and therefore the lower clutch switch 13 outputs an OFF signal.

The vehicle 1A includes a battery 21. Power from the battery 21 is supplied to a starter motor 23 via a starter motor drive relay 22. The starter motor 23 starts the internal combustion engine 2 by executing cranking on the internal combustion engine 2 using a power supply. The power of the battery 21 is supplied to a first electric load 26 via a DC/DC converter 25 or to a second electric load 27 directly. The second electric load 27 includes a headlamp, for example. The DC/DC converter 25 regulates a voltage of the battery 21 to a fixed voltage.

The vehicle 1A also includes an alternator 24 that is driven by the internal combustion engine 2 to perform power generation. Alternating current power generated by the alternator 24 is converted into a direct current by an inbuilt inverter, and then stored in the battery 21. Fuel injection by the fuel injector 3 of the internal combustion engine 2, ignition by the spark plug 4, and an operation of the starter motor 23 via the starter motor drive relay 22 are respectively controlled by an engine controller 11.

The engine controller 11 is constituted by a microcomputer comprising a central processing unit (CPU), a read-only memory (ROM), a random access memory (RAM), and an input/output interface (I/O interface). The engine controller 11 may be constituted by a plurality of microcomputers.

Signals from the upper clutch switch 12 and the lower clutch switch 13 are input into the engine controller 11. Further, a signal indicating a shift position of the manual transmission 7, detected by a shift sensor 14, a signal indicating a brake fluid pressure of a brake of the vehicle 1A, detected by a brake switch 15, a signal indicating a crank angle, detected by a crank angle sensor 16, a signal indicating a vehicle speed VSP, detected by a vehicle speed sensor 17, and a signal indicating a battery voltage, detected by a voltage sensor 18, are input into the engine controller 11. The crank angle signal is also used as a signal representing a rotation speed Ne of the internal combustion engine 2.

The brake switch 15 is not a mechanical switch but a software switch constituted by a pressure sensor or the like that outputs an OFF signal when the brake fluid pressure is equal to or smaller than a fluid pressure threshold and outputs an ON signal when the brake fluid pressure exceeds the fluid pressure threshold. When the brake fluid pressure is equal to or smaller than the fluid pressure threshold, this indicates a state in which the brake pedal is not depressed.

The engine controller 11 controls a fuel supply amount and a supply timing from the fuel injector 3 and an ignition timing by the spark plug 4 in accordance with a depression amount of an accelerator pedal of the vehicle 1A.

Further, to reduce a fuel consumption amount, when a first automatic stopping condition is established during a vehicle stoppage, the engine controller 11 automatically stops the internal combustion engine 2. Furthermore, to increase opportunities for automatically stopping the internal combustion engine 2, the engine controller 11 automatically stops the internal combustion engine 2 when a second automatic stopping condition is established while the vehicle 1A travels. It should be noted, however, that in both cases, automatic stopping is performed only when a warming operation of the internal combustion engine 2 is complete.

The engine controller 11 automatically stops the internal combustion engine 2 both during a stoppage and during travel by stopping fuel injection by the fuel injector 3 and ignition by the spark plug 4. These operations will be referred to collectively as a fuel cut. A fuel cut means that driving of the internal combustion engine 2 is stopped without stopping rotation of the internal combustion engine 2. Therefore, the internal combustion engine 2 may continue to rotate through inertia even after the internal combustion engine 2 has been automatically stopped by a fuel cut.

In a period where the internal combustion engine 2 is automatically stopped, fuel is not consumed, and therefore the fuel consumption can be reduced by automatic stopping.

When, in a state where the internal combustion engine 2 has been automatically stopped following establishment of the first automatic stopping condition, a first restarting condition of the internal combustion engine 2 is established, the engine controller 11 cranks the internal combustion engine 2 by activating the starter motor 23, and restarts fuel injection by the fuel injector 23 and ignition of the injected fuel by the spark plug 4. As a result, the internal combustion engine 2 is restarted from a stopped state.

When a second restarting condition is established in a state where the internal combustion engine 2 has been automatically stopped following establishment of the second automatic stopping condition, the internal combustion engine 2 is restarted similarly.

In other words, when the first stopping condition is established during a vehicle stoppage such that the internal combustion engine 2 is automatically stopped, the engine controller 11 does not restart the internal combustion engine 2 even following establishment of the second restarting condition. The engine controller 11 restarts the internal combustion engine 2 only when the first restarting condition is established.

Similarly, when the second automatic stopping condition is established while the vehicle 1A travels such that the internal combustion engine 2 is automatically stopped, the engine controller 11 does not restart the internal combustion engine 2 even after establishment of the first restarting condition. The engine controller 11 restarts the internal combustion engine 2 only when the second restarting condition is established.

Hence, when the second automatic stopping condition is established while the vehicle 1A travels such that the internal combustion engine 2 is automatically stopped and the vehicle 1A stops in that state, automatic stoppage of the internal combustion engine 2 is continued until the second restarting condition is established, regardless of whether or not the first restarting condition is established. The engine controller 11 then restarts the internal combustion engine 2 when the second restarting condition is established while the vehicle 1A is stationary.

Figure 2:
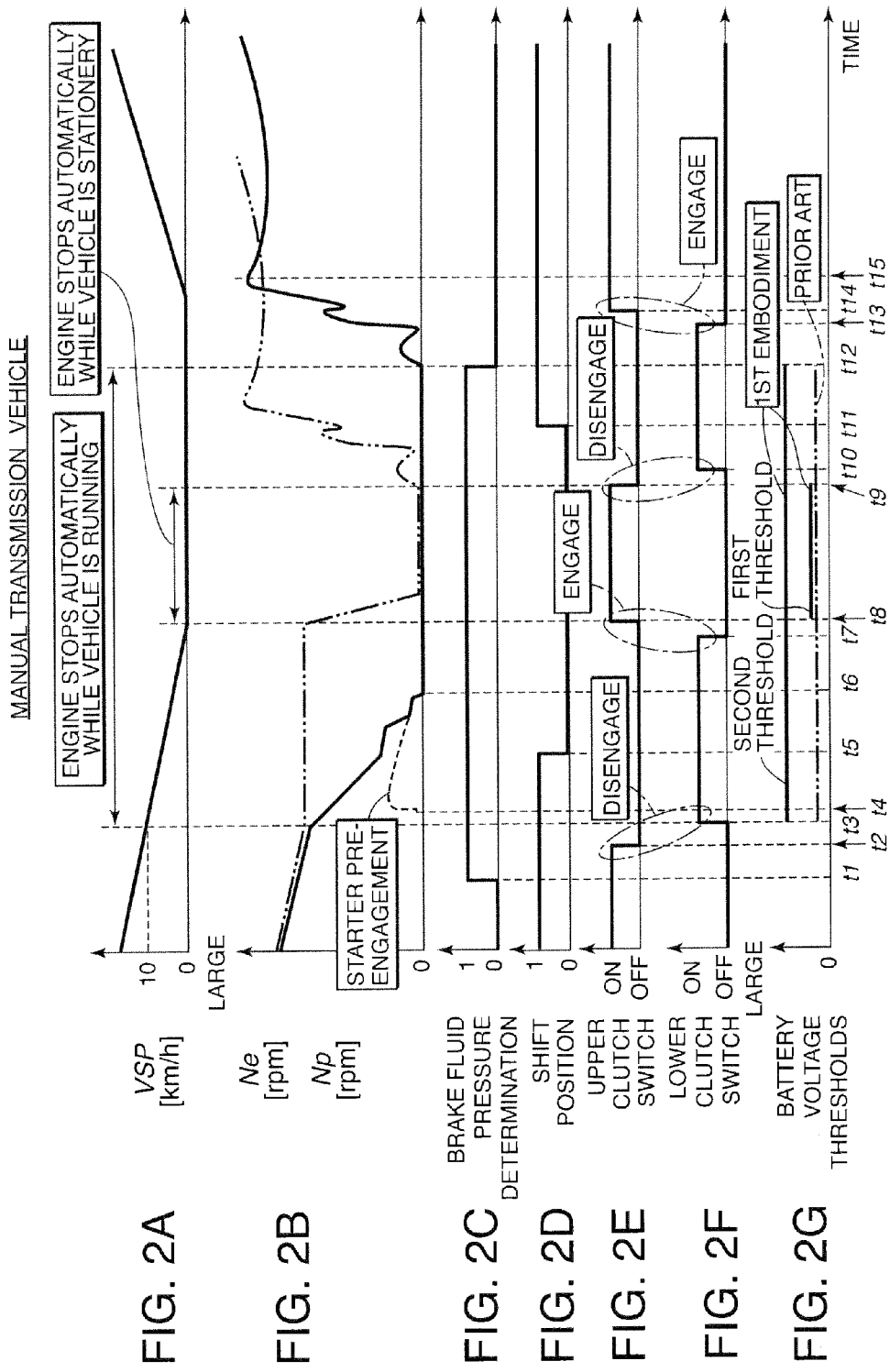
FIGS. 2A to 2G are timing charts illustrating operation states of the internal combustion engine controlled by the automatic stopping and automatic restarting device.

Referring to FIGS. 2A to 2G, a case in which the internal combustion engine 2 is stopped during a vehicle stoppage and a case in which the internal combustion engine 2 is automatically stopped while the vehicle 1A travels will be described. It should be noted that for ease of comparison, automatic stoppage of the internal combustion engine 2 during a vehicle stoppage and automatic stoppage of the internal combustion engine 2 during travel are shown side by side in FIGS. 2A to 2G. In reality, however, the two cases are not performed simultaneously. A solid line in FIG. 2B shows variation in the engine rotation speed Ne when the internal combustion engine 2 is automatically stopped while the vehicle 1A travels. A dot-dot-dash line in FIG. 2B shows variation in the engine rotation speed Ne when the internal combustion engine 2 is automatically stopped while the vehicle 1A is stationary. Reasons why the internal combustion engine 2 is restarted at different timings in the two cases will be described below.

During a period extending from a time t3 to a time t12, the second automatic stopping condition is established, and during a period extending from a time t8 to a time t9, the first automatic stopping condition is established. In other words, by automatically stopping the internal combustion engine 2 not only during a vehicle stoppage but also while the vehicle 1A travels, a fuel cut can be executed during a period extending from the time t3 to the time t8, and as a result, fuel consumption can be suppressed.

A case in which the second automatic stopping condition is established while the vehicle 1A travels such that the internal combustion engine 2 is automatically stopped and the second restarting condition is established thereafter such that the internal combustion engine 2 is restarted will now be considered. Even when a load of the battery 21 is increased by driving the starter motor 23 in order to restart the internal combustion engine 2, it is necessary to maintain a performance of electrical equipment provided in the vehicle 1A such as a headlamp, a horn, and a wiper. In other words, it is necessary to maintain a brightness of the headlamp, for example.

A power requirement of the electrical equipment is greater during travel than during a stoppage. In other words, a battery voltage must be increased relatively in a case where the internal combustion engine 2 is automatically stopped while the vehicle 1A travels in comparison with a case where the internal combustion engine 2 is automatically stopped during a vehicle stoppage.

A corresponding capacity of the battery 21 relative to the power requirement of the electrical equipment may be determined from a battery state of charge (SOC) instead of the battery voltage.

The first automatic stopping condition, the second automatic stopping condition, the first restarting condition, and the second restarting condition respectively include requirements relating to the battery voltage. Further, different battery voltage conditions are applied to each thereof.

More specifically, the first automatic stopping condition applied during a vehicle stoppage requires that the battery voltage be equal to or greater than a first voltage threshold. The second automatic stopping condition applied during travel requires that the battery voltage be equal to or greater than a second voltage threshold. Here, the second voltage threshold is set at a greater value than the first voltage threshold.

Meanwhile, when the clutch pedal 6 is depressed while the internal combustion engine 2 is stopped following establishment of the first automatic stopping condition, the first restarting condition is established, and therefore the engine controller 11 restarts the internal combustion engine 2. When the shift position of the manual transmission 7 is in a position other than neutral and either the clutch pedal 6 is depressed and the brake pedal is returned or the accelerator pedal is depressed while the internal combustion engine 2 is stopped following establishment of the second automatic stopping condition, the second restarting condition is established, and therefore the engine controller 11 restarts the internal combustion engine 2. Hence, in a case where the internal combustion engine 2 is automatically stopped while the vehicle 1A travels, the internal combustion engine 2 is maintained in the stopped state either until the vehicle 1A accelerates or up to a point immediately before the vehicle 1A restarts from a stationary state.

When a restarting time of the internal combustion engine 2 is long in a case where automatic stoppage of the internal combustion engine 2 is maintained either until the vehicle 1A accelerates or up to a point immediately before the vehicle 1A restarts from a stationary state, startup or acceleration of the vehicle 1A is delayed. Therefore, the second threshold is set to be greater than the first threshold.

As a result of this setting, the battery voltage when the internal combustion engine 2 is automatically stopped while the vehicle 1A travels is relatively higher than the battery voltage when the internal combustion engine 2 is automatically stopped during a vehicle stoppage. When the battery voltage is high, the restarting time of the internal combustion engine 2 in a case where the internal combustion engine 2 is automatically stopped while the vehicle 1A travels does not increase, and therefore an acceleration or restart responsive of the vehicle 1A is not impaired.

Referring back to FIGS. 2A to 2G, the first voltage threshold relating to the battery voltage of the first automatic stopping condition applied during a vehicle stoppage and the second voltage threshold relating to the battery voltage of the second automatic stopping condition applied during travel will be described further.

FIGS. 2A to 2G show variation in the vehicle speed VSP, the internal combustion engine rotation speed Ne, a pinion rotation speed Np, a brake fluid pressure determination, the shift position of the manual transmission 7, the upper clutch switch 12, the lower clutch switch 13, and the battery voltage thresholds in a case where the vehicle 1A comprising the manual transmission 7 decelerates slowly to a stop while coasting and is then restarted.

The solid line in FIG. 2B shows variation in the engine rotation speed Ne in a case where the second automatic stopping condition is established while the vehicle 1A travels such that the internal combustion engine 2 is stopped and then the second restarting condition is established such that the internal combustion engine 2 is restarted. The dot-dot-dash line in FIG. 2B shows variation in the engine rotation speed Ne in a case where the first automatic stopping condition is established while the vehicle 1A is stationary such that the internal combustion engine 2 is stopped and then the first restarting condition is established such that the internal combustion engine 2 is restarted. For convenience, both lines are drawn on the same diagram, but these two types of automatic stoppage are not performed in parallel simultaneously, and only one of the two types of automatic stoppage is executed.

When the driver depresses the brake pedal at a time t1, where the vehicle speed VSP has decreased to a speed slightly exceeding 10 km/hr, the brake fluid pressure exceeds a predetermined fluid pressure threshold, and therefore the brake switch 15 switches ON such that a brake oil pressure determination flag is switched from 0 to 1. At this time, the shift position of the manual transmission 7 is in a first speed position. In FIG. 2D, a shift position "1" indicates a shift position other than the neutral position. The shift position signal likewise indicates "1" when the shift position corresponds to a second speed and a third speed.

When the driver depresses the clutch pedal 6 at a time t2, the clutch 5 is completely disengaged at a time t3. A period extending from the time t2 to the time t3 corresponds to a stroke period of the clutch pedal 6.

At the time t3, where the vehicle speed decreases to 10 km/hr, the second automatic stopping condition applied while the vehicle 1A travels is established. Here, the second automatic stopping condition is established when following conditions (1) to (6) are all satisfied.

(1) Deterioration of the battery 21 has not advanced to a predetermined state.
(2) The brake pedal is depressed, or in other words the brake switch 15 is ON.
(3) The shift position of the manual transmission 7 is in a position other than neutral.
(4) The clutch pedal 6 is depressed and the clutch 5 is completely disengaged, or in other words the lower clutch switch 13 is ON.
(5) The vehicle speed VSP is no higher than a predetermined vehicle speed, for example 10 km/hr.
(6) A battery voltage VB is greater than the second voltage threshold.

Here, the threshold relating to the battery voltage VB in the first restarting condition is the first voltage threshold, while the threshold relating to the battery voltage VB in the second restarting condition is the second voltage threshold.

Including the condition (6) in the second automatic stopping condition applied while the vehicle 1A travels and setting the second voltage threshold to be higher than the first voltage threshold are the principal features of the engine automatic stopping device. The condition (1) will be described below.

A case in which the second automatic stopping condition is established while the vehicle 1A travels such that the internal combustion engine 2 is automatically stopped and the second restarting condition is established during vehicle travel thereafter such that the internal combustion engine 2 is restarted will now be considered. At this time, even when the load of the battery 21 is increased by driving the starter motor 23, it is necessary to maintain the performance of the electrical equipment. Therefore, the power requirement of the electrical equipment is higher when the internal combustion engine 2 is restarted while the vehicle 1A travels than when the internal combustion engine 2 is restarted from a stationary state.

In accordance with this requirement, the second voltage threshold is set at a greater value than the first voltage threshold. The voltage thresholds are set in advance. The battery voltage VB detected by the voltage sensor 18 is used to determine the condition (6).

When the second automatic stopping condition applied while the vehicle 1A travels is established at the time t3, the engine controller 11 automatically stops the internal combustion engine 2 by performing a fuel cut. Accordingly, the engine rotation speed Ne decreases rapidly from the time t3 onward.

When the driver sets the shift position of the manual transmission 7 in the neutral position at a time t5, the engine rotation speed Ne reaches zero at a time t6, whereby the internal combustion engine 2 stops rotating.

It should be noted that starter pre-engagement begins at a time t4 immediately after the clutch 5 is disengaged. Starter pre-engagement is an operation to pre-mesh a pinion and a ring gear of the starter motor 23 in advance in preparation for restarting of the internal combustion engine 2. This operation is performed by the engine controller 11.

Starter pre-engagement will now be described. A flywheel is fixed to a rear end of a crankshaft of the internal combustion engine 2. The ring gear is formed on an outer periphery of the flywheel. Upon reception of a start request, the starter motor 23 drives the ring gear to rotate by meshing the pinion to the ring gear. This operation is known as cranking of the internal combustion engine 2.

The pinion of the starter motor 23 is normally not meshed to the ring gear. A certain amount of time is required to mesh the pinion to the ring gear. However, when the internal combustion engine 2 is restarted after being automatically stopped, it is desirable to perform cranking as early as possible. In response to this requirement, starter pre-engagement is performed to intermesh the pinion and the ring gear of the starter motor 23 in advance when the clutch 5 is disengaged. Thus, when a restarting request is issued in relation to the internal combustion engine 2, the pinion is already meshed to the ring gear, and therefore cranking can be started immediately.

When the driver removes his/her foot from the clutch pedal 6 at a time t7, the clutch 5 is completely engaged at the time t8.

At the time t8, where the vehicle speed reaches zero, the internal combustion engine 2 is maintained in the stopped condition regardless of whether or not the first automatic stopping condition applied during a vehicle stoppage is established.

Next, when the driver depresses the clutch pedal 6 at a time t9 in order to restart the vehicle 1A, the clutch 5 is completely disengaged at a time t10. A period extending from the time t9 to the time t10 corresponds to a stroke period of the clutch pedal.

At a time t11, the driver switches the shift position of the manual transmission 7 from the neutral position to the first speed or the second speed, for example. When the driver removes his/her foot from the brake pedal at the time t12, the brake fluid pressure falls to or below the brake fluid threshold such that the brake switch 15 switches OFF, and as a result, the brake oil pressure determination flag switches from 1 to 0. At this timing, the second restarting condition applied while the vehicle 1A travels is established. The second restarting condition is established when a following condition (11) is satisfied and one of conditions (12) to (14) is satisfied.

(11) The shift position of the manual transmission 7 is in a position other than neutral.
(12) The clutch pedal 6 is depressed and the brake pedal is not depressed.
(13) The accelerator pedal is depressed.
(14) The battery voltage VB is no greater than the second voltage threshold.

In the case shown in FIGS. 2A to 2G, the condition (11) and the condition (12) are satisfied. When the second restarting condition is established, the engine controller 11 cranks the internal combustion engine 2 by driving the starter motor 23 via the starter motor drive relay 22, and restarts fuel injection into the internal combustion engine 2 by the fuel injector 3 and ignition by the spark plug 4. When the internal combustion engine 2 is restarted, the engine rotation speed Ne increases rapidly. At a time t15 following complete explosion in the internal combustion engine 2, the engine rotation speed Ne settles at an idle rotation speed.

The driver senses the increase in the internal combustion engine rotation speed Ne and starts to depress the accelerator pedal while returning the depressed clutch pedal 6 at a time t13 such that the clutch 5 is set in the half clutch state. At a time t14, the clutch 5 is completely engaged. When the clutch 5 is completely engaged, the power of the internal combustion engine 2 is transmitted to the drive wheel 10, and as a result, the vehicle speed VSP increases from zero.

Next, a case in which the second automatic stopping condition is not established while the vehicle 1A travels, and instead, the internal combustion engine 2 is stopped following establishment of the first automatic stopping condition, whereupon the internal combustion engine 2 is restarted following establishment of the first restarting condition, will be described. As noted above, this case corresponds to the dot-dot-dash line in FIG. 2B.

The vehicle speed VSP may fall to zero while the internal combustion engine 2 continues to rotate but the second automatic stopping condition is not established during vehicle travel. This may occur when, for example, the battery voltage VB is between the second voltage threshold and the first voltage threshold, the vehicle speed decreases without depressing the brake pedal on an uphill slope, and so on. In this case, the first automatic stopping condition is established at the time t8. The first automatic stopping condition is established when following conditions (21) to (25) are all satisfied.

(21) Deterioration of the battery 21 has not advanced to the predetermined condition.
(22) The shift position of the manual transmission 7 is in the neutral position.
(23) The clutch pedal 6 is returned such that the clutch 5 is engaged, or in other words the lower clutch switch 13 is OFF.
(24) The vehicle speed VSP is at or in the vicinity of 0 km/hr.
(25) The battery voltage VB is greater than the first voltage threshold.

When the first automatic stopping condition is established at the time t8, the engine controller 11 automatically stops the internal combustion engine 2 by performing a fuel cut.

When the driver depresses the clutch pedal 6 at the time t9 in order to start the vehicle 1A after the internal combustion engine 2 has been automatically stopped upon establishment of the first automatic stopping condition, the clutch 5 is completely disengaged at the time t10.

Meanwhile, the first restarting condition is established at the time t9. The first restarting condition is established when one of following conditions (31) and (32) is satisfied.
(31) The clutch pedal 6 is depressed.
(32) The battery voltage VB is not greater than the first voltage threshold.

In the case shown in FIGS. 2A to 2G, the condition (31) is satisfied. When the first restarting condition is established, the engine controller 11 automatically restarts the internal combustion engine 2.

Figure 3:
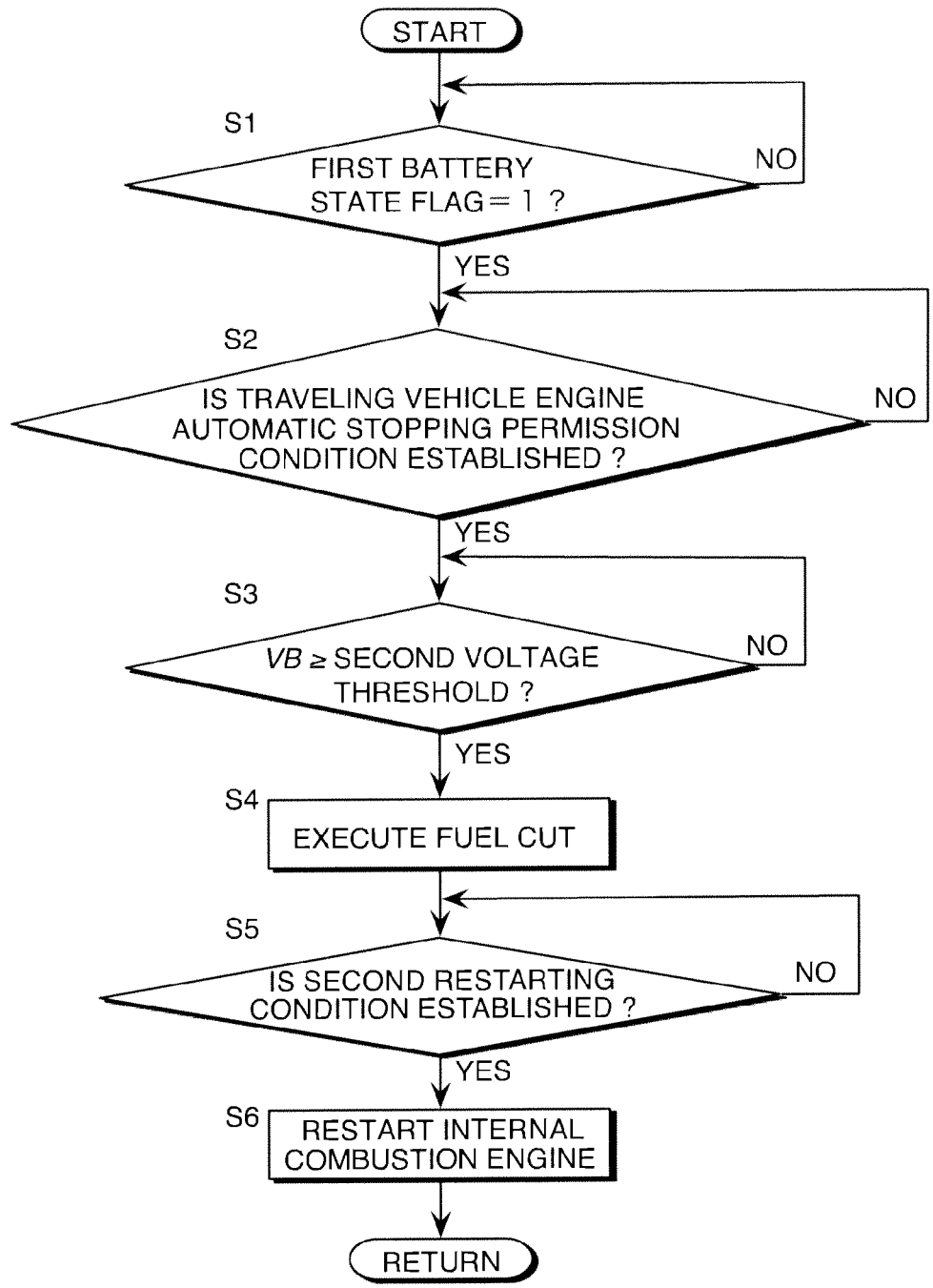
FIG. 3 is a flowchart illustrating an automatic stopping and restarting routine executed on the internal combustion engine during vehicle travel by a controller according to the first embodiment of this invention.

Referring to FIG. 3, a routine executed by the engine controller 11 to automatically stop and restart the internal combustion engine 2 when the vehicle 1A is traveling in order to realize the above control will be described.

This routine is executed during vehicle travel. The routine is executed repeatedly while the vehicle 1A travels by starting a new routine at the same time as a previous routine ends.

In steps S1, S2, and S3, the engine controller 11 determines whether or not the second automatic stopping condition applied while the vehicle 1A travels is established. Here, the six conditions (1) to (6) are grouped into three groups, namely the condition (1), the conditions (2), (3), (4), and (5), and the condition (6).

In the step S1, the engine controller 11 determines whether or not the condition (1) is satisfied. This determination is made by determining whether or not a first battery state flag applied during vehicle travel is at unity. The first battery state flag is set in a battery deterioration state determination routine to be described below. When the determination is negative, the engine controller 11 waits until the first battery state flag switches to 1 before advancing to the following step S2.

When the determination of the step S1 is affirmative, the engine controller 11 determines in the step S2 whether or not all of the conditions (2), (3), (4), and (5) are satisfied. Here, the conditions (2), (3), (4), and (5) will be referred to collectively as a traveling vehicle engine automatic stopping permission condition. The traveling vehicle engine automatic stopping permission condition is therefore established when all of the conditions (2), (3), (4), and (5) are satisfied.

While the determination of the step S2 remains negative, the engine controller 11 waits without advancing to the following step S3. When the determination of the step S2 is affirmative, the engine controller 11 compares the battery voltage VB detected by the voltage sensor 18 to the second voltage threshold in the step S3. When the battery voltage VB equals or exceeds the second voltage threshold, the engine controller 11 executes a fuel cut in a step S4. When the battery voltage VB is smaller than the second voltage threshold, the engine controller 11 waits without advancing to the step S4.

After executing the fuel cut in the step S4, the engine controller 11 performs processing of a step S5.

In the step S5, the engine controller 11 determines whether or not the second restarting condition is established. The second restarting condition is established when the condition (11) is satisfied and one of the conditions (12) to (14) is satisfied.

When the second restarting condition is established in the step S5, the engine controller 11 restarts the internal combustion engine 2 in a step S6. More specifically, the engine controller 11 cranks the internal combustion engine 2 by driving the starter motor 23 via the starter motor drive relay 22, and restarts fuel injection into the internal combustion engine 2 by the fuel injector 3 and ignition by the spark plug 4. Following the processing of the step S6, the engine controller 11 terminates the routine. It should be noted that when the routine is complete, the engine controller 11 immediately begins execution of the next routine.

When, on the other hand, the second restarting condition is not established in the step S5, the engine controller 11 waits until the second restarting condition is established.

Next, referring to FIG. 4, a routine executed by the engine controller 11 to automatically stop and restart the internal combustion engine 2 when the vehicle 1A is stationary will be described. This routine is executed when the vehicle 1A is stationary. The routine is likewise executed repeatedly while the vehicle 1A is stationary by starting a new routine at the same time as a previous routine is terminated.

It is assumed that the engine controller 11 determines whether the vehicle 1A is traveling or stationary on the basis of the vehicle speed VSP detected by the vehicle speed sensor 17.

Figure 4:
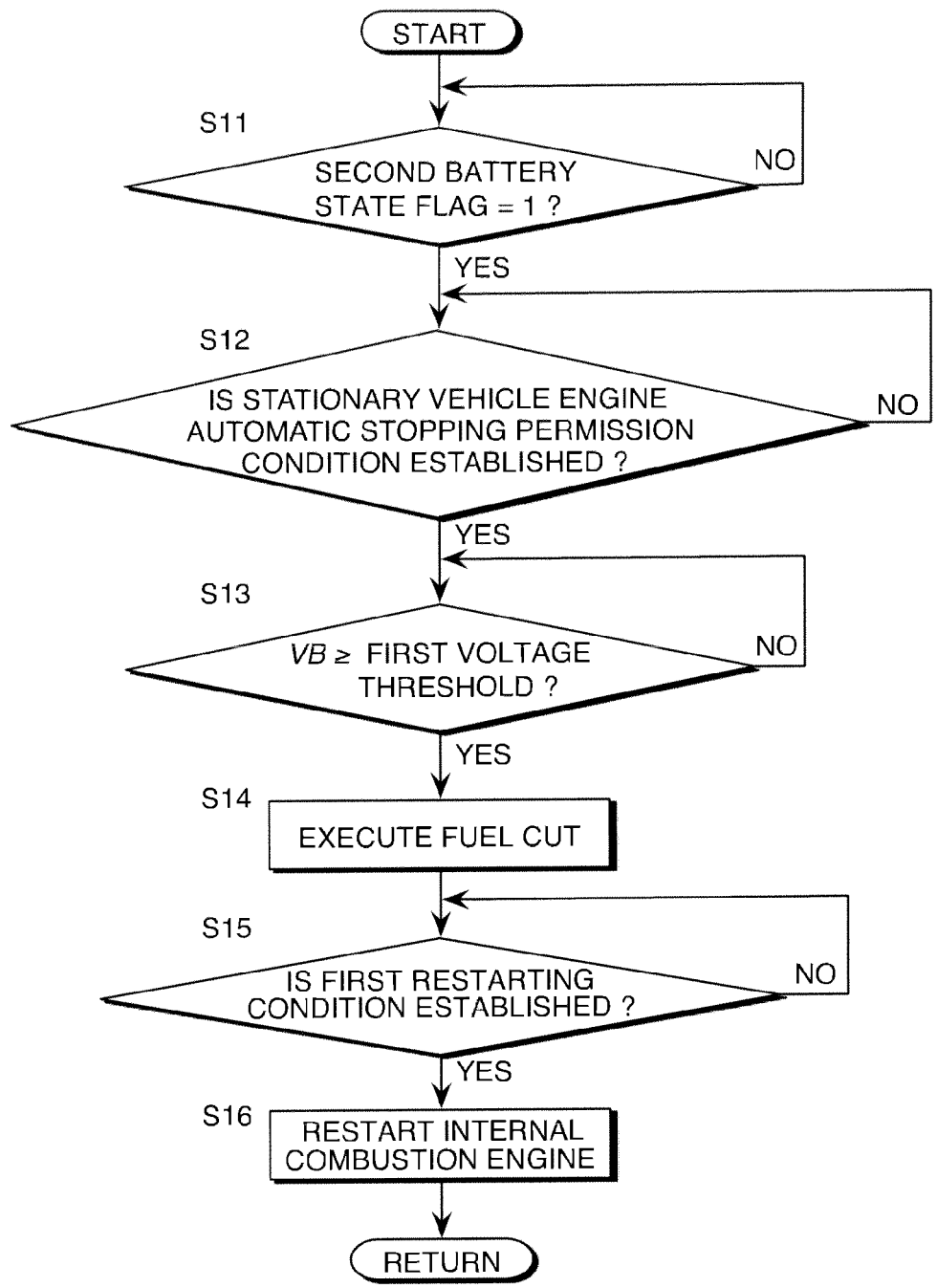
FIG. 4 is a flowchart illustrating an automatic stopping and restarting routine executed on the internal combustion engine during a vehicle stoppage by the controller.

Processing content of the routine in FIG. 4 is substantially identical to that of the routine in FIG. 3 for automatically stopping and restarting the internal combustion engine 2 during travel.

Hence, in steps S11, S12, and S13, the engine controller 11 determines whether or not the first automatic stopping condition is established. Here, the five conditions (21) to (25) are grouped into three groups, namely the condition (21), the conditions (22), (23), and (24), and the condition (25).

First, in the step S11, the engine controller 11 determines whether or not the condition (21) is satisfied. This determination is made by determining whether or not a second battery state flag applied when the vehicle is stationary is at unity. The second battery state flag is set in the battery deterioration state determination routine to be described below.

When the determination is negative, the engine controller 11 waits until the second battery state flag switches to 1 before advancing to the following step S12.

In the step S12, the engine controller 11 determines whether or not all of the conditions (22), (23), and (24) are satisfied. Here, the conditions (22), (23), and (24) will be referred to collectively as a stationary vehicle engine automatic stopping permission condition. The stationary vehicle engine automatic stopping permission condition is therefore established when all of the conditions (22), (23), and (24) are satisfied.

While the determination of the step S12 remains negative, the engine controller 11 waits without advancing to the following step S13.

When the determination of the step S12 is affirmative, the engine controller 11 compares the battery voltage VB detected by the voltage sensor 18 to the first voltage threshold in the step S13. When the battery voltage VB equals or exceeds the first voltage threshold, the engine controller 11 executes a fuel cut in a step S14. When the battery voltage VB is smaller than the first voltage threshold, the engine controller 11 waits without advancing to the step S14.

After executing the fuel cut in the step S14, the engine controller 11 performs processing of a step S15.

In the step S15, the engine controller 11 determines whether or not the first restarting condition is established. The first restarting condition is established when one of the conditions (31) and (32) is satisfied.

When the first restarting condition is established in the step S15, the engine controller 11 restarts the internal combustion engine 2 in a step S16. More specifically, the engine controller 11 cranks the internal combustion engine 2 by driving the starter motor 23 via the starter motor drive relay 22, and restarts fuel injection into the internal combustion engine 2 by the fuel injector 3 and ignition by the spark plug 4. Following the processing of the step S16, the engine controller 11 terminates the routine. It should be noted that when the routine is complete, the engine controller 11 immediately begins execution of the next routine.

When, on the other hand, the first restarting condition is not established in the step S15, the engine controller 11 waits until the first restarting condition is established.

As described above, the automatic stopping and restarting routine of FIG. 3, which is executed on the internal combustion engine 2 as the vehicle 1A travels, and the automatic stopping and restarting routine of FIG. 4, which is executed on the internal combustion engine 2 when the vehicle 1A is stationary, are executed selectively in accordance with the vehicle speed VSP at the start of execution of the routine. Once execution of one of the routines has started, the other routine is not executed until the routine is complete. Hence, when the routine of FIG. 3 for automatically stopping and restarting the internal combustion engine 2 as the vehicle 1A travels is executed, execution of this routine is continued even if the vehicle 1A stops. In this case, therefore, the internal combustion engine 2 is not restarted when the first restarting condition is established at the time t9, and the internal combustion engine 2 is restarted only when the second restarting condition is established at the time t12.

On the other hand, when the first restarting condition is established at the time t9 during execution of the routine in FIG. 4 for automatically stopping and restarting the internal combustion engine 2 during a vehicle stoppage, the internal combustion engine 2 is restarted immediately.

Figure 5:
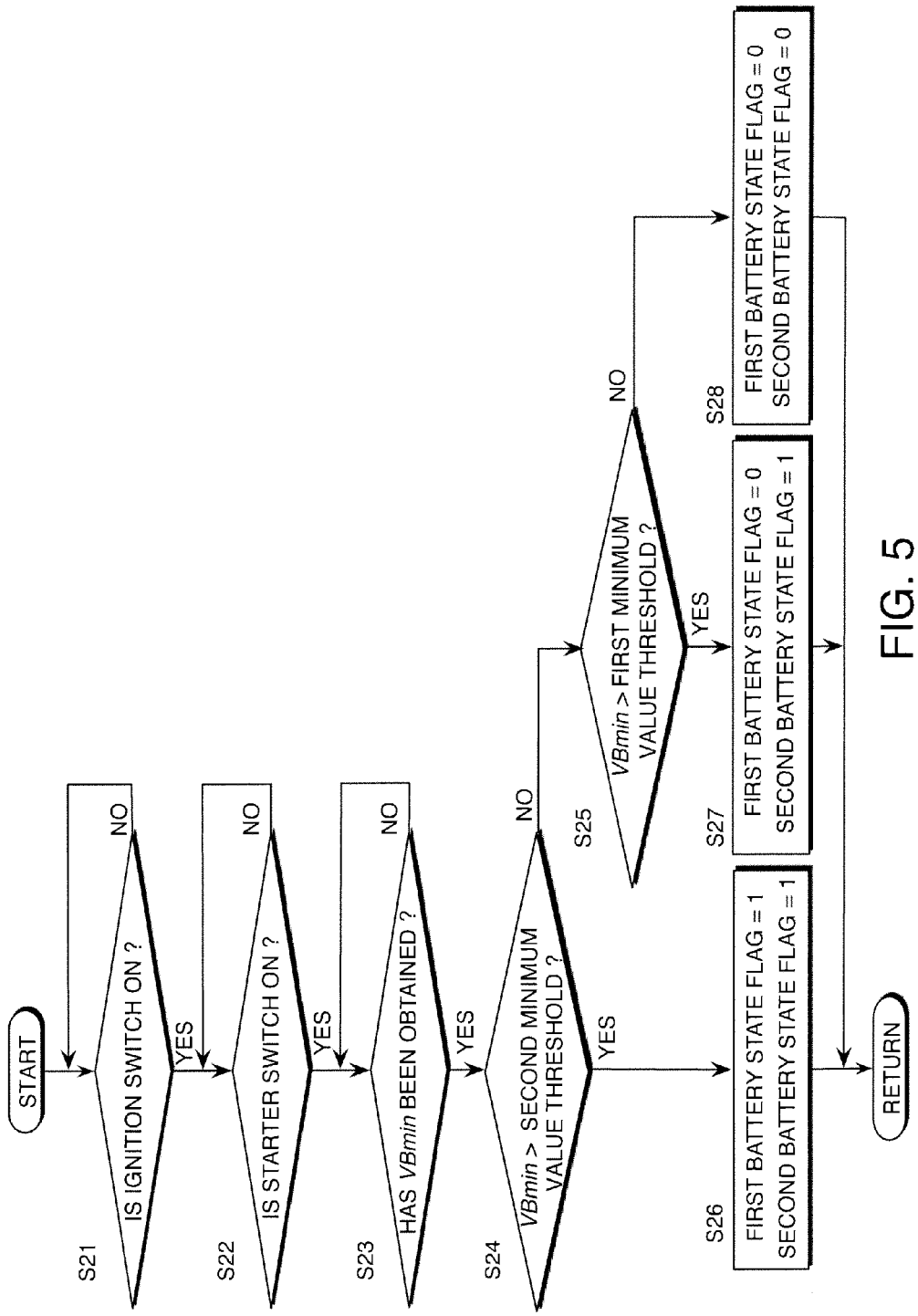
FIG. 5 is a flowchart illustrating a battery deterioration state determination routine executed by the controller.

Referring to FIG. 5, the battery deterioration state determination routine executed by the engine controller 11 will be described. This routine is performed to set the first battery state flag determined in the step S1 of FIG. 3 and the second battery state flag determined in the step S11 of FIG. 4. The routine is executed at the same time as a main switch of the vehicle 1A switches ON, i.e. prior to execution of the routines in FIGS. 3 and 4. The routine is performed to determine a deterioration state of the battery 21 in order to determine whether or not the conditions (1) and (21) are satisfied.

In a step S21, the engine controller 11 determines whether or not an ignition switch of the vehicle 1A is ON. When the ignition switch is not ON, the engine controller 11 waits until the ignition switch switches ON before advancing to a following step S22.

When the ignition switch is ON, the engine controller 11 determines in the step S22 whether or not a starter switch for starting the starter motor 23 is ON. When the starter switch is not ON, the engine controller 11 waits until the starter switch switches ON before advancing to a following step S23.

When the starter switch is ON, the engine controller 11 determines in the step S23 whether or not a minimum value VBmin of the battery voltage has been obtained.

Figure 6A:
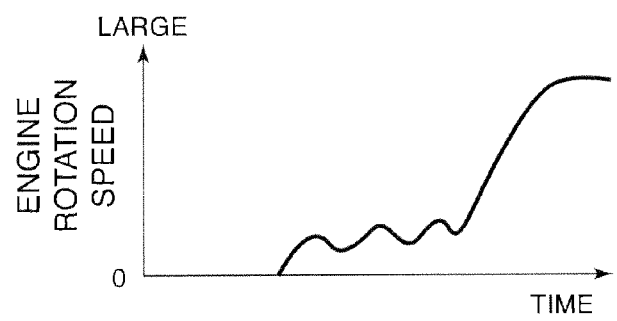
FIGS. 6A and 6B are timing charts showing variation in a battery voltage during startup of the internal combustion engine.
Figure 6B:
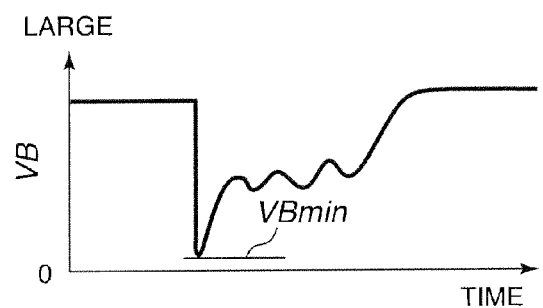

Referring to FIGS. 6A and 6B, when the internal combustion engine 2 is started by operating the ignition switch and the starter switch while the vehicle 1A is stationary, the battery voltage VB momentarily decreases rapidly from a fixed voltage maintained thereby prior to startup, and then gradually recovers to its original level. The battery voltage at the time of this rapid decrease will be referred to as the minimum value VBmin of the battery voltage. The minimum value VBmin of the battery voltage is obtained through a separate routine on the basis of the battery voltage VB detected by the voltage sensor 18.

When it is determined in the step S23 that the minimum value VBmin of the battery voltage has not been obtained, the engine controller 11 waits until the minimum value VBmin of the battery voltage is obtained before advancing to a following step S24.

When it is determined in the step S23 that the minimum value VBmin of the battery voltage has been obtained, the engine controller 11 performs processing of the step S24 onward.

In the step S24, the engine controller 11 determines whether or not the minimum value VBmin of the battery voltage is greater than a second minimum value threshold. When the determination is affirmative, this means that the battery 21 has not deteriorated to a degree that will hinder automatic stoppage of the internal combustion engine 2 while the vehicle 1A travels and automatic stoppage of the internal combustion engine 2 while the vehicle 1A is stationary.

In this case, the engine controller 11 sets both the first battery state flag and the second battery state flag at 1 in a step S26 and then terminates the routine. When both the first battery state flag and the second battery state flag are at 1, this means that deterioration of the battery 21 is not advanced. In other words, the internal combustion engine 2 can be automatically stopped both while the vehicle 1A travels and while the vehicle 1A is stationary.

When the determination of the step S24 is negative, the engine controller 11 determines in a step S25 whether or not the minimum value VBmin of the battery voltage is greater than a first minimum value threshold. Here, the second minimum value threshold is set at a greater value than the first minimum value threshold. Further, both the first minimum value threshold and the second minimum value threshold take smaller values than the first voltage threshold and the second voltage threshold.

When the determination of the step S25 is affirmative, the engine controller 11 resets the first battery state flag to zero and sets the second battery state flag to 1 in a step S27, and then terminates the routine. This means that deterioration of the battery 21 is sufficiently advanced to hinder automatic stoppage of the internal combustion engine 2 while the vehicle 1A travels but not sufficiently advanced to hinder automatic stoppage of the internal combustion engine 2 while the vehicle 1A is stationary.

When the determination of the step S24 is negative, the engine controller 11 resets both the first battery state flag and the second battery state flag to zero in a step S28, and then terminates the routine. When both the first battery state flag and the second battery state flag are at zero, this means that the battery 21 has deteriorated to a degree that will hinder both automatic stoppage of the internal combustion engine 2 while the vehicle 1A travels and automatic stoppage of the internal combustion engine 2 while the vehicle 1A is stationary.

By determining whether or not the first battery state flag is at 1 in the step S1 of the routine in FIG. 3, a determination is made as to whether or not deterioration of the battery 21 is sufficiently small not to hinder automatic stoppage of the internal combustion engine 2 while the vehicle 1A travels. When the determination is negative, the engine controller 11 does not perform the processing of the step S2 onward. Hence, when it is determined on the basis of the second minimum value threshold that the battery 21 has deteriorated, automatic stoppage is not performed on the internal combustion engine 2 while the vehicle 1A travels.

By determining whether or not the second battery state flag is at 1 in the step S11 of the routine in FIG. 4, a determination is made as to whether or not deterioration of the battery 21 is sufficiently small not to hinder automatic stoppage of the internal combustion engine 2 while the vehicle 1A is stationary. When the determination is negative, the engine controller 11 does not perform the processing of the step S12 onward. Hence, when it is determined on the basis of the first minimum value threshold that the battery 21 has deteriorated, automatic stoppage is not performed on the internal combustion engine 2 while the vehicle 1A is stationary.

As described above, when the internal combustion engine 2 is to be automatically stopped while the vehicle 1A is stationary or traveling, the engine automatic stopping device determines whether or not the battery 21 is in a state that can satisfy the power requirement of the electrical equipment upon restarting of the internal combustion engine 2, and either executes or prohibits automatic stoppage of the internal combustion engine 2 in accordance with the determination result. Hence, a situation in which insufficient power is supplied from the battery 21 to the electrical equipment when the internal combustion engine 2 is restarted can be prevented.

Further, by setting the second voltage threshold used to determine the battery state as the automatic stopping condition applied to the internal combustion engine 2 while the vehicle 1A travels to be greater than the first voltage threshold used to determine the battery state as the automatic stopping condition applied to the internal combustion engine 2 while the vehicle 1A is stationary, the automatic stopping condition can be set in accordance with differences in the power requirement of the electrical equipment during vehicle travel and a vehicle stoppage, and therefore opportunities for automatically stopping the internal combustion engine 2 can be increased while preventing a deficiency in the power supplied from the battery 21 to the electrical equipment.

Furthermore, by including the battery deterioration state in the automatic stopping condition applied to the internal combustion engine 2, the degree of deterioration of the battery 21 is reflected in the automatic stopping condition of the internal combustion engine 2. As a result, opportunities for automatically stopping the internal combustion engine 2 can be increased while preventing a power supply deficiency caused by deterioration of the battery 21. Moreover, the second minimum value threshold used to determine the battery deterioration state as the automatic stopping condition applied to the internal combustion engine 2 while the vehicle 1A travels is set to be greater than the first minimum value threshold used to determine the battery deterioration state as the automatic stopping condition applied to the internal combustion engine 2 while the vehicle 1A is stationary. Therefore, opportunities for automatically stopping the internal combustion engine 2 can be further increased while preventing a power supply deficiency caused by deterioration of the battery 21.

Referring to FIG. 7 and FIGS. 8A to 8D, an engine automatic stopping device according to a second embodiment of this invention will be described.

Figure 7:
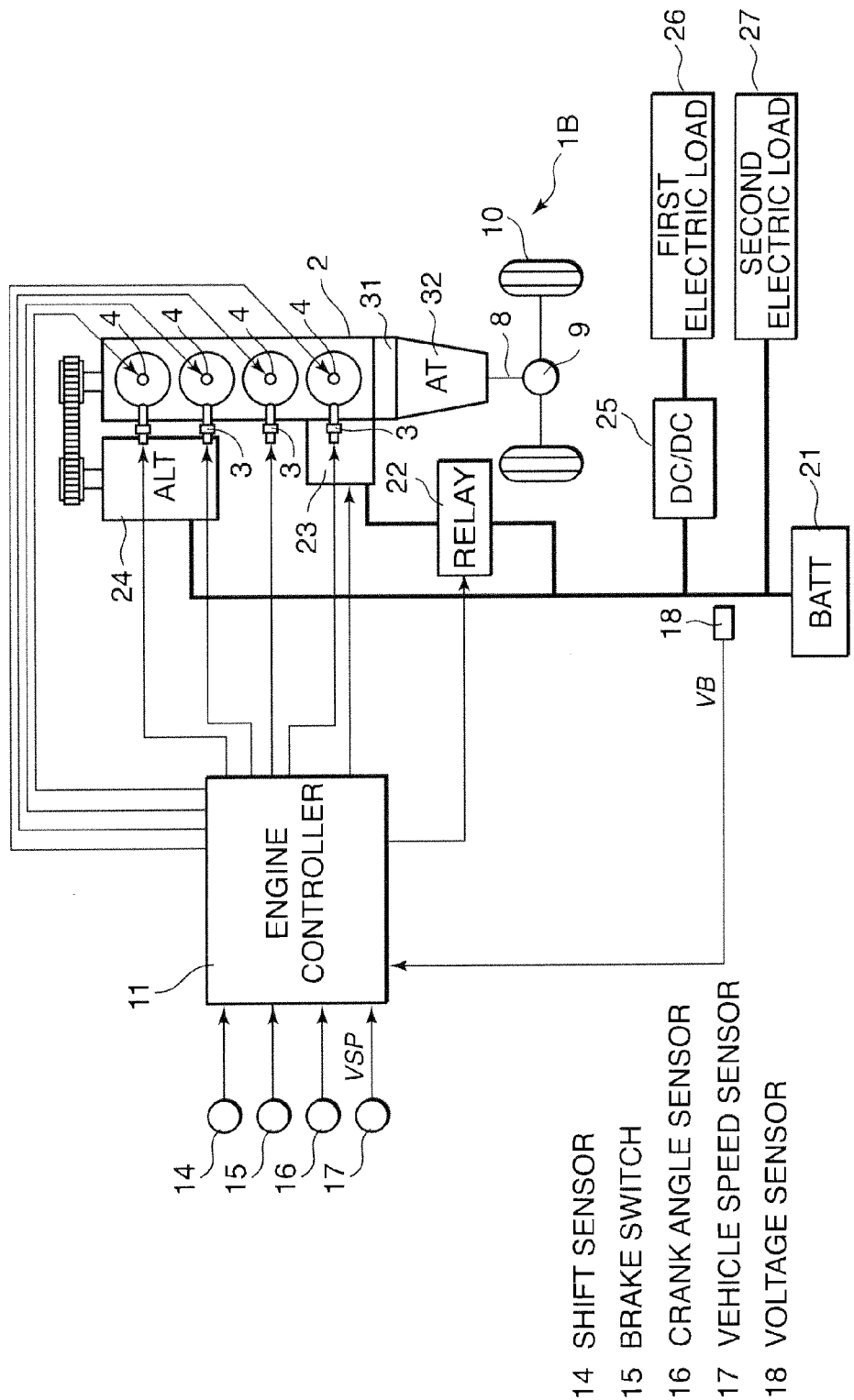
FIG. 7 is similar to FIG. 1, but shows a second embodiment of this invention.

The engine automatic stopping device according to the first embodiment is applied to the vehicle 1A comprising the manual transmission 7 and the clutch 5, whereas an engine automatic stopping device according to the second embodiment is applied to a vehicle 1B comprising an automatic transmission 32 and a torque converter 31 as shown in FIG. 7.

FIGS. 8A to 8D show variation in the vehicle speed VSP, the engine rotation speed Ne, the pinion rotation speed Np, the brake fluid pressure determination, and the first and second voltage thresholds in a case where the vehicle 1B comprising the automatic transmission 32 and the torque converter 31 decelerates slowly to a stop while coasting and is then restarted. It should be noted that since the vehicle 1B has different specifications to the vehicle 1A, the first voltage threshold takes a different value to the first voltage threshold of the first embodiment. Similarly, the second voltage threshold takes a different value to the second voltage threshold of the first embodiment.

A solid line and a dot-dot-dash line in FIG. 8B respectively show variation in the engine rotation speed Ne when the internal combustion engine 2 is automatically stopped while the vehicle 1B travels and when the internal combustion engine 2 is automatically stopped while the vehicle 1B is stationary. For convenience, both lines are drawn on the same diagram, but these two types of automatic stoppage are not performed in parallel simultaneously, and only one of the two types of automatic stoppage is executed.

In the engine automatic stopping device for the vehicle 1B comprising the automatic transmission 32 and the torque converter 31, the second automatic stopping condition applied while the vehicle 1B travels differs from the second automatic stopping condition of the first embodiment. Further, the first automatic stopping condition applied while the vehicle 1B is stationary differs from the first automatic stopping condition of the first embodiment.

Here, the second automatic stopping condition applied while the vehicle 1B travels is established when all of following conditions (41) to (43) are satisfied.

(41) The brake pedal is depressed, or in other words the brake switch 15 is ON.
(42) The vehicle speed VSP is at a lockup clutch OFF vehicle speed.
(43) The battery voltage VB is greater than the second voltage threshold.

The conditions (41) and (43) are identical to the conditions (2) and (6) of the second automatic stopping condition according to the first embodiment. The condition (42) is a unique condition to this engine automatic stopping device.

The second voltage threshold is determined in order to satisfy the power requirement of the electrical equipment when the internal combustion engine 2 is automatically stopped upon establishment of the second automatic stopping condition applied while the vehicle 1B travels and the second automatic restarting condition is established while the vehicle 1B travels thereafter such that the internal combustion engine 2 is restarted.

When a lockup clutch is engaged, an input shaft and an output shaft of the torque converter 31 are directly coupled. When the lockup clutch is disengaged, the input shaft and the output shaft of the torque converter 31 are not directly coupled. By engaging the lockup clutch in a predetermined operating region such that the input shaft and the output shaft of the torque converter 31 are directly coupled, the fuel consumption of the vehicle 1B can be reduced. However, when the input shaft and the output shaft of the torque converter 31 are maintained in a directly coupled state in a low vehicle speed region, vibration of the drive wheel 10 is transmitted to the internal combustion engine 2, leading to deterioration of a driving feeling. Hence, when the vehicle speed VSP decreases to or below a predetermined vehicle speed, the lockup clutch is disengaged. The lockup clutch OFF vehicle speed of the condition (42) is a vehicle speed at which the lockup clutch is disengaged.

The first automatic stopping condition applied while the vehicle 1B is stationary is established when all of following conditions (51) to (53) are satisfied.
(51) The brake pedal is depressed, or in other words the brake switch 15 is ON.
(52) The vehicle speed VSP is at or in the vicinity of 0 km/hr.
(53) The battery voltage VB is greater than the first voltage threshold.

The conditions (52) and (53) are identical to the conditions (24) and (25) of the first automatic stopping condition according to the first embodiment. The condition (51) is a unique condition to this engine automatic stopping device.

Likewise in this embodiment, the second voltage threshold used to determine the battery state as the second automatic stopping condition applied while the vehicle 1B travels is set at a greater value than the first voltage threshold used to determine the battery state as the first automatic stopping condition applied while the vehicle 1B is stationary.

In this engine automatic stopping device, on the other hand, the first restarting condition and the second restarting condition are identical, and both are established when a condition (61) is satisfied.
(61) The brake pedal is returned, or in other words the brake switch 15 is OFF.

According to the second embodiment, similarly to the first embodiment, a deficiency in the power supply from the battery 21 to the electrical equipment can be prevented during restarting of the internal combustion engine 2 likewise in relation to the vehicle 1B comprising the automatic transmission 32 and the torque converter 31, and therefore a favorable effect can be obtained.

The contents of Tokugan 2010-165711, with a filing date of Jul. 23, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiments described above, the deterioration state of the battery 21 is determined by obtaining the battery voltage at the start timing of the internal combustion engine 2 as the minimum value VBmin of the battery voltage and comparing the minimum value VBmin to the minimum value threshold. However, the deterioration state of the battery 21 may be determined using another method.

INDUSTRIAL FIELD OF APPLICATION

As described above, with the engine automatic stopping device according to this invention, an internal combustion engine can be automatically stopped and restarted while satisfying a power requirement of electrical equipment of a vehicle. Therefore, a favorable effect can be expected in terms of reducing a fuel consumption of the vehicle.

The embodiments of this invention in which an exclusive property or privilege is claimed are defined as follows:

1. An automatic stopping device for an internal combustion engine of a vehicle comprising a battery that is charged by an operation of the internal combustion engine and an electrical load that is operated by power stored in the battery, comprising a programmable controller programmed to:
 stop, during a vehicle stoppage, the internal combustion engine automatically when a first automatic stopping condition is established; and
 stop, during vehicle travel, the internal combustion engine automatically when a second automatic stopping condition is established;
 wherein the first automatic stopping condition is established when a battery voltage or a battery state of charge of the battery equals or exceeds a first threshold, and
 the second automatic stopping condition is established when the battery voltage or the battery state of charge of the battery equals or exceeds a second threshold that is set to be greater than the first threshold, and
 wherein the controller is further programmed to prevent automatic stoppage of the internal combustion engine, during vehicle travel, when the battery voltage or the battery state of charge of the battery is lower than the second threshold.

2. The automatic stopping device for the internal combustion engine as defined in claim 1, wherein the controller is further programmed to:
 detect a deterioration state of the battery;
 prohibit automatic stoppage of the internal combustion engine based on the first automatic stopping condition during a vehicle stoppage, when the deterioration state exceeds a predetermined first deterioration state; and
 prohibit automatic stoppage of the internal combustion engine based on the second automatic stopping condition during vehicle travel, when the deterioration state exceeds a predetermined second deterioration state,
 wherein the predetermined second deterioration state is set at a smaller degree of deterioration than the predetermined first deterioration state.

3. The automatic stopping device for the internal combustion engine as defined in claim 1, wherein the controller is further programmed to:

restart the internal combustion engine when a clutch pedal is depressed while the internal combustion engine is stopped in accordance with establishment of the first automatic stopping condition, and restart the internal combustion engine when the clutch pedal is depressed and a brake pedal is released or an accelerator pedal is depressed while the internal combustion engine is stopped in accordance with establishment of the second automatic stopping condition.

4. An automatic stopping method for an internal combustion engine of a vehicle comprising a battery that is charged by an operation of the internal combustion engine, and an electrical load that is operated by power stored in the battery, the method comprising:

stopping, during a vehicle stoppage, the internal combustion engine automatically when a first automatic stopping condition is established; and stopping, during vehicle travel, the internal combustion engine automatically when a second automatic stopping condition is established, wherein the first automatic stopping condition is established when a battery voltage or a battery state of charge of the battery equals or exceeds a first threshold, the second automatic stopping condition is established when the battery voltage or the battery state of charge of the battery equals or exceeds a second threshold that is set to be greater than the first threshold, and wherein the method further comprises preventing automatic stoppage of the internal combustion engine during vehicle travel when the battery voltage or the battery state of charge of the battery is lower than the second threshold.

\* \* \* \* \*